United States Patent
Meissner et al.

(10) Patent No.: US 11,681,011 B2
(45) Date of Patent: Jun. 20, 2023

(54) DETECTION OF INTERFERENCE-INDUCED PERTURBATIONS IN FMCW RADAR SYSTEMS

(71) Applicant: Infineon Technologies AG, Neubiberg (DE)

(72) Inventors: Paul Meissner, Feldkirchen bei Graz (AT); Mate Andras Toth, Graz (AT)

(73) Assignee: Infineon Technologies AG, Neubiberg (DE)

( * ) Notice: Subject to any disclaimer, the term of this patent is extended or adjusted under 35 U.S.C. 154(b) by 107 days.

(21) Appl. No.: 15/930,173

(22) Filed: May 12, 2020

(65) Prior Publication Data
US 2020/0379081 A1 Dec. 3, 2020

(30) Foreign Application Priority Data
May 29, 2019 (DE) .......................... 102019114551.1

(51) Int. Cl.
*G01S 7/02* (2006.01)
*G01S 7/35* (2006.01)
*G01S 13/931* (2020.01)

(52) U.S. Cl.
CPC .............. *G01S 7/023* (2013.01); *G01S 7/354* (2013.01); *G01S 13/931* (2013.01)

(58) Field of Classification Search
CPC .......... G01S 7/023; G01S 7/022; G01S 7/021; G01S 7/354; G01S 7/36; G01S 13/931
USPC .................................................. 342/195, 70
See application file for complete search history.

(56) References Cited

U.S. PATENT DOCUMENTS

| | | | | |
|---|---|---|---|---|
| 6,772,100 B2* | 8/2004 | Lipp | ..................... | G01S 13/723 702/194 |
| 7,024,188 B2* | 4/2006 | Khun-Jush | ............ | H04W 16/14 455/423 |
| 7,375,676 B1 | 5/2008 | Loberger | | |
| 7,460,058 B2* | 12/2008 | Nakanishi | ................. | G01S 7/36 342/128 |
| 7,768,448 B2* | 8/2010 | Tyree | .................... | F41G 7/2246 342/195 |
| 8,405,544 B2* | 3/2013 | Nakagawa | ............ | G01S 13/937 342/146 |
| 8,471,760 B2* | 6/2013 | Szajnowski | ........... | G01S 7/0232 342/70 |

(Continued)

FOREIGN PATENT DOCUMENTS

| AU | 2015101677 A4 * | 12/2015 | ............... G01S 7/36 |
|---|---|---|---|
| CN | 112088317 A * | 12/2020 | ........... G01S 13/584 |

(Continued)

*Primary Examiner* — Erin F Heard
*Assistant Examiner* — Michael W Justice
(74) *Attorney, Agent, or Firm* — Harrity & Harrity, LLP (57) ABSTRACT

The description below relates to a method for a radar system that can be used to detect perturbations in the received radar signal. According to an example implementation, the method comprises providing a digital radar signal using a radar receiver, wherein the digital radar signal comprises a multiplicity of segments; calculating an envelope signal that represents the envelope of a segment of the digital radar signal; and ascertaining a time of the onset of an interference signal contained in the considered segment of the digital radar signal by using at least one statistical parameter of the envelope signal.

20 Claims, 7 Drawing Sheets

(56) References Cited

U.S. PATENT DOCUMENTS

| | | | |
|---|---|---|---|
| 9,140,772 B1* | 9/2015 | Dewberry | G01S 13/765 |
| 9,140,788 B2* | 9/2015 | Kuehnle | G01S 7/411 |
| 9,223,015 B2* | 12/2015 | Kojima | G01S 13/10 |
| 9,395,444 B2* | 7/2016 | Subburaj | G01S 19/21 |
| 9,772,397 B1 | 9/2017 | Bordes et al. | |
| 10,340,962 B2* | 7/2019 | Utter | H04B 1/1036 |
| 2003/0115007 A1* | 6/2003 | Lipp | G01S 13/42 702/94 |
| 2005/0054294 A1* | 3/2005 | Khun-Jush | H04W 16/14 455/63.1 |
| 2007/0018886 A1 | 1/2007 | Watanabe et al. | |
| 2007/0120731 A1 | 5/2007 | Kelly, Jr. et al. | |
| 2008/0094274 A1* | 4/2008 | Nakanishi | G01S 13/931 342/91 |
| 2009/0096661 A1 | 4/2009 | Sakamoto | |
| 2010/0066596 A1* | 3/2010 | Tyree | G01S 7/38 342/195 |
| 2010/0066597 A1* | 3/2010 | Tyree | G01S 13/42 342/195 |
| 2010/0214157 A1 | 8/2010 | McEwan | |
| 2011/0291875 A1* | 12/2011 | Szajnowski | G01S 7/36 342/70 |
| 2011/0298651 A1* | 12/2011 | Nakagawa | G01S 7/023 342/146 |
| 2013/0335260 A1* | 12/2013 | Kuehnle | G01S 13/931 342/70 |
| 2013/0342383 A1* | 12/2013 | Kojima | G01S 7/023 342/134 |
| 2014/0354475 A1* | 12/2014 | Subburaj | G01S 19/21 342/357.59 |
| 2016/0238694 A1 | 8/2016 | Kishigami et al. | |
| 2016/0291130 A1 | 10/2016 | Ginsburg et al. | |
| 2017/0010344 A1 | 1/2017 | Corbett | |
| 2017/0234967 A1 | 8/2017 | Farhoud et al. | |
| 2017/0324434 A1* | 11/2017 | Utter | H04B 1/1036 |
| 2017/0343646 A1 | 11/2017 | Bechter | |
| 2017/0363711 A1 | 12/2017 | Rao et al. | |
| 2018/0003799 A1 | 1/2018 | Yang et al. | |
| 2019/0369221 A1* | 12/2019 | Umehira | G01S 7/023 |
| 2020/0379081 A1* | 12/2020 | Meissner | G01S 7/023 |
| 2020/0393536 A1* | 12/2020 | Stettiner | G01S 7/0235 |
| 2021/0156980 A1* | 5/2021 | Stettiner | G01S 7/0232 |
| 2021/0156981 A1* | 5/2021 | Stettiner | G01S 13/346 |
| 2021/0156982 A1* | 5/2021 | Stettiner | G01S 13/584 |

FOREIGN PATENT DOCUMENTS

| | | | | |
|---|---|---|---|---|
| DE | 2155074 A1 | 5/1973 | | |
| EP | 2390679 A1 | 11/2011 | | |
| EP | 3037840 A1 | 6/2016 | | |
| EP | 3056920 A1 | 8/2016 | | |
| EP | 3173812 A1 | 5/2017 | | |
| EP | 3489710 A1 * | 5/2019 | | G01S 13/931 |
| WO | 2018163677 A1 | 9/2018 | | |

* cited by examiner

DETECTION OF INTERFERENCE-INDUCED PERTURBATIONS IN FMCW RADAR SYSTEMS

CROSS REFERENCE TO RELATED APPLICATION

This application claims priority to German Patent Application No. 102019114551.1 filed on May 29, 2019, the content of which is incorporated by reference herein in its entirety.

TECHNICAL FIELD

The present description relates to the field of radar sensors, for example processing methods used in radar sensors, that allow detection of perturbing interference.

BACKGROUND

Radar sensors are used in a multiplicity of applications for detecting objects, wherein the detection usually comprises measuring distances and velocities of the detected objects. In particular in the automotive sector, radar sensors can be used inter alia in driving assistance systems (advanced driver assistance systems, ADAS) such as e.g. in adaptive cruise control (ACC, or radar cruise control) systems. Such systems can automatically adapt the velocity of an automobile so as to keep a safe distance from other automobiles traveling ahead (and also from other objects and from pedestrians). Further applications in the automotive sector are e. g. blind spot detection, lane change assist and the like. In the field of autonomous driving, radar sensors and systems having multiple sensors will play an important part for the control of autonomous vehicles.

Since automobiles are increasingly equipped with radar sensors, the likelihood of interference increases. That is to say that a radar signal transmitted by a first radar sensor (installed in a first vehicle) can be injected into the receiving antenna of a second radar sensor (installed in a second vehicle). In the second radar sensor, the first radar signal can interfere with an echo of the second radar signal and in this way adversely affect the operation of the second radar sensor.

SUMMARY

The description below relates to a method for a radar system that can be used to detect perturbations in the received radar signal. According to an example implementation, the method comprises providing a digital radar signal using a radar receiver, wherein the digital radar signal comprises a multiplicity of segments; calculating an envelope signal that represents the envelope of a segment of the digital radar signal; and ascertaining a time of the onset of an interference signal contained in the considered segment of the digital radar signal by using at least one statistical parameter of the envelope signal.

In addition, a radar system is described. According to an example implementation, the system has a radar receiver designed to provide a digital radar signal that comprises a multiplicity of segments. The system also has a computing unit designed to calculate an envelope signal that represents the envelope of a segment of the digital radar signal. The computing unit is also designed to ascertain a time of an onset of an interference signal contained in the segment of the digital radar signal by using at least one statistical parameter of the envelope signal.

BRIEF DESCRIPTION OF THE DRAWINGS

Example implementations are explained in more detail below on the basis of figures. The depictions are not necessarily to scale and the example implementations are not limited just to the depicted aspects. Rather, importance is attached to presenting the principles on which the example implementations are based. In the figures.

DETAILED DESCRIPTION

Figure 1:
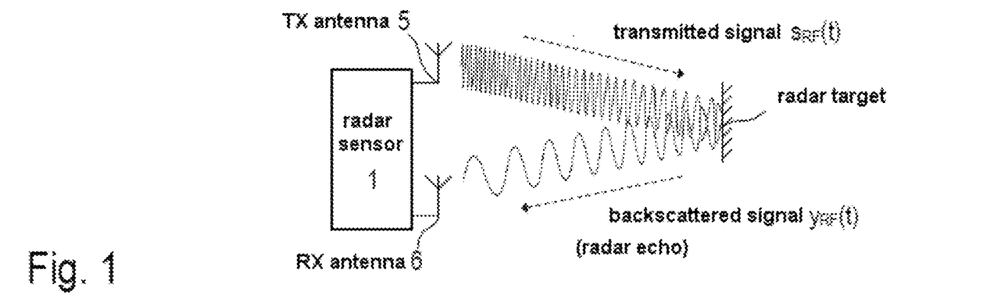
FIG. 1 is an outline to illustrate the operating principle of an FMCW radar system for distance and/or velocity measurement.

FIG. 1 uses a schematic diagram to illustrate the use of a frequency-modulated continuous-wave radar system for the most part referred to as an FMCW radar system as a sensor for measuring distances and velocities of objects, which are usually referred to as radar targets. In the present example, the radar apparatus 1 has separate transmitting (TX) and receiving (RX) antennas 5 and 6, referred to as a bistatic or pseudo-monostatic radar configuration. It should be noted, however, that a single antenna can also be used, which serves as transmitting antenna and as receiving antenna simultaneously (monostatic radar configuration). The transmitting antenna 5 transmits a continuous RF signal $s_{RF}(t)$, which is frequency-modulated with a type of sawtooth signal (periodic, linear frequency ramp), for example. The transmitted signal $s_{RF}(t)$ is scattered back from the radar target T and the backscattered/reflected signal $y_{RF}(t)$ (echo signal) is received by the receiving antenna 6. FIG. 1 shows a simplified example; in practice, radar sensors are systems having multiple transmission (TX) and reception (RX) channels, so as also to be able to determine the angle of incidence (Direction of Arrival, DoA) of the backscattered/reflected signal $y_{RF}(t)$ and hence more accurately locate the radar target T.

Figure 2:
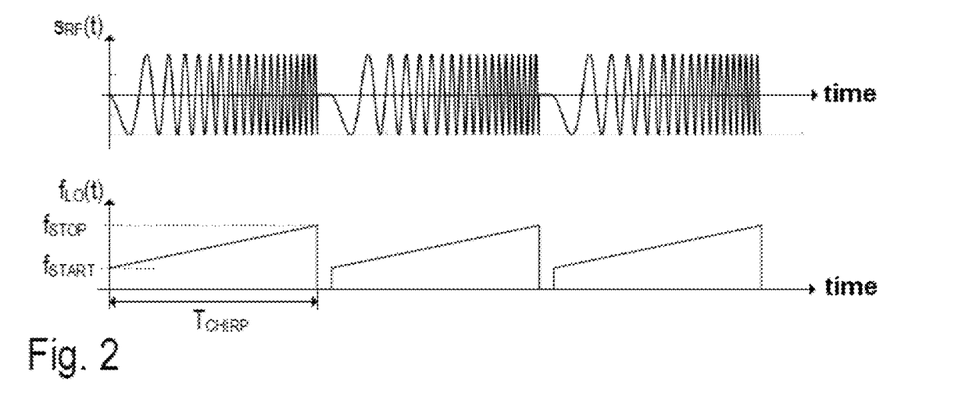
FIG. 2 comprises two timing diagrams to illustrate the frequency modulation (FM) of the RF signal generated by the FMCW system.

FIG. 2 illustrates the aforementioned frequency modulation of the signal $s_{RF}(t)$ in example fashion. As depicted in FIG. 2 (top graph), the transmitted RF signal $s_{RF}(t)$ is made up of a set of "chirps", e.g. the signal $s_{RF}(t)$ comprises a sequence of sinusoidal waveforms with rising frequency (up-chirp) or falling frequency (down-chirp). In the present example, the instantaneous frequency $f_{LO}(t)$ of a chirp rises linearly, beginning at a start frequency $f_{START}$, to a stop frequency $f_{STOP}$ within a time period $T_{CHIRP}$ (see bottom graph in FIG. 2). Such chirps are also referred to as linear frequency ramps. FIG. 2 depicts three identical linear frequency ramps. It should be noted, however, that the parameters $f_{START}$, $f_{STOP}$, $T_{CHIRP}$ and the pause between the individual frequency ramps can vary. The change of frequency also does not necessarily have to be linear (linear chirp). Depending on the implementation, transmission signals with exponential or hyperbolic frequency variation (exponential or hyperbolic chirps) can also be used, for example. For a measurement, a sequence of frequency ramps is always transmitted and the resulting echo signal is evaluated in baseband in order to detect one or more radar targets.

Figure 3:
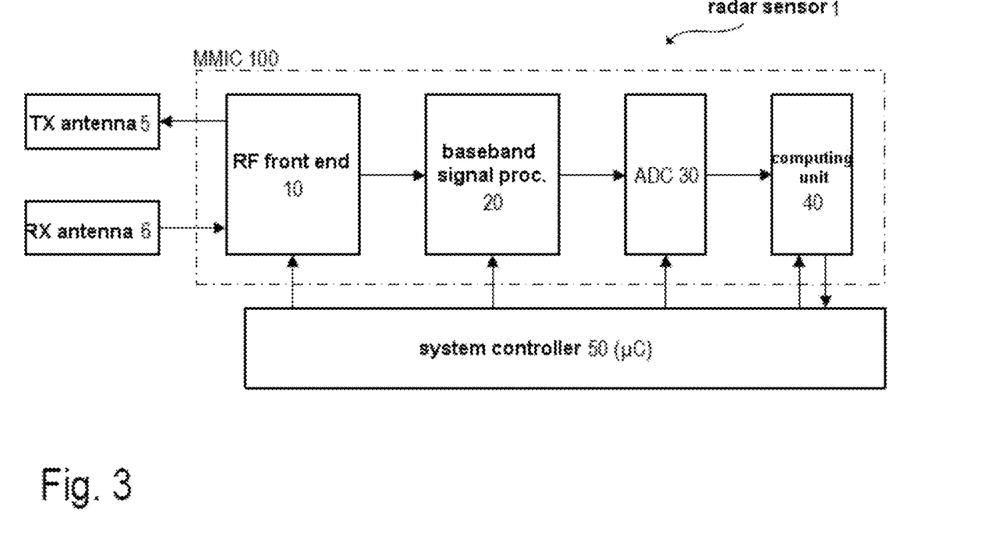
FIG. 3 is a block diagram to illustrate the basic structure of an FMCW radar system.

FIG. 3 is a block diagram depicting a possible structure of a radar apparatus 1 (radar sensor) in example fashion. Accordingly, at least one transmitting antenna 5 (TX antenna) and at least one receiving antenna 6 (RX antenna) are connected to an RF front end 10, integrated in a chip, that can contain all those circuit components that are used for the RF signal processing. These circuit components comprise for example a local oscillator (LO), RF power amplifiers, low-noise amplifiers (LNA), directional couplers (e.g. rat-race couplers, circulators, etc.) and also mixers for down-conversion of the RF signals to baseband or an intermediate-frequency band (IF band). The RF front end 10 can be integrated together with further circuit components in a chip, which is usually referred to as a monolithically microwave integrated circuit (MIMIC). Baseband is sometimes also referred to as IF band (depending on the implementation). No further distinction is drawn below between baseband and IF band, and only the term baseband is used. Baseband signals are those signals on the basis of which the detection of radar targets is performed.

The depicted example shows a bistatic (or pseudo-monostatic) radar system having separate RX and TX antennas. In the case of a monostatic radar system, the same antenna would be used both to transmit and to receive the electromagnetic (radar) signals. In this case, for example a directional coupler (e.g. a circulator) can be used to separate the RF signals to be transmitted from the received RF signals (radar echo signals). As mentioned, radar systems in practice usually have multiple transmission and reception channels having multiple transmitting and receiving antennas (antenna arrays), which allows, among other things, measurement of the direction (DoA) from which the radar echoes are received. In such MIMO (Multiple-Input Multiple-Output) systems, the individual TX channels and RX channels are usually each of the same or a similar design and can be distributed over multiple integrated circuits (MMICs).

In the case of an FMCW radar system, the RF signals transmitted via the TX antenna 5 can be e.g. in the range from approximately 20 GHz to 100 GHz (e.g. in the range from approximately 76-81 GHz in a good many applications). As mentioned, the RF signal received by the RX antenna 6 contains the radar echoes (chirp echo signals), e.g. those signal components that are scattered back from one or more radar targets. The received RF signal $y_{RF}(t)$ is down-converted to baseband and processed further in baseband using analog signal processing (see FIG. 3, analog baseband signal processing chain 20). The analog signal processing substantially comprises a filtering and an amplification of the baseband signal. The baseband signal is finally digitized (see FIG. 3, analog-to-digital converter 30) and processed further in the digital domain. The digital signal processing chain can be realized at least partly as software, which can be executed on a processor, for example a microcontroller or a digital signal processor (see FIG. 3, computing unit 40). The overall system is normally controlled using a system controller 50, which can likewise be implemented at least partly as software that is executed on a processor such as e.g. a microcontroller. The RF front end 10 and the analog baseband signal processing chain 20 and also the analog-to-digital converter 30 and optionally also the computing unit 40 (or parts thereof) can be integrated together in a single MMIC (e.g. on an RF semiconductor chip). Alternatively, the individual components can also be distributed over multiple MMICs. The computing unit 40 or parts thereof can be contained in the system controller 50.

In the examples described here, "computing unit" means any structure or group of functional entities that are designed to perform the functions (calculations). A computing unit can comprise one or more processors designed to execute software/firmware instructions. The computing unit can (additionally or alternatively) also have hardwired hardware units, however, that are designed especially to quickly perform specific calculations (e.g. a CFAR algorithm or a fast Fourier transformation, etc.). The computing unit is not necessarily integrated in one chip but rather can also be distributed over multiple chips.

The system controller 50 can be integrated in a separate chip and designed to communicate with the MMIC 100 (or multiple MMICs) via one or more communication connections. Suitable communication connections are e.g. a serial peripheral interface (SPI) bus or low-voltage differential signalling (LVDS) in accordance with the TIA/EIA-644 standard. Parts of the aforementioned computing unit can be integrated in the system controller 50. The computing unit or parts thereof can also be integrated in the radar MMIC.

Figure 4:
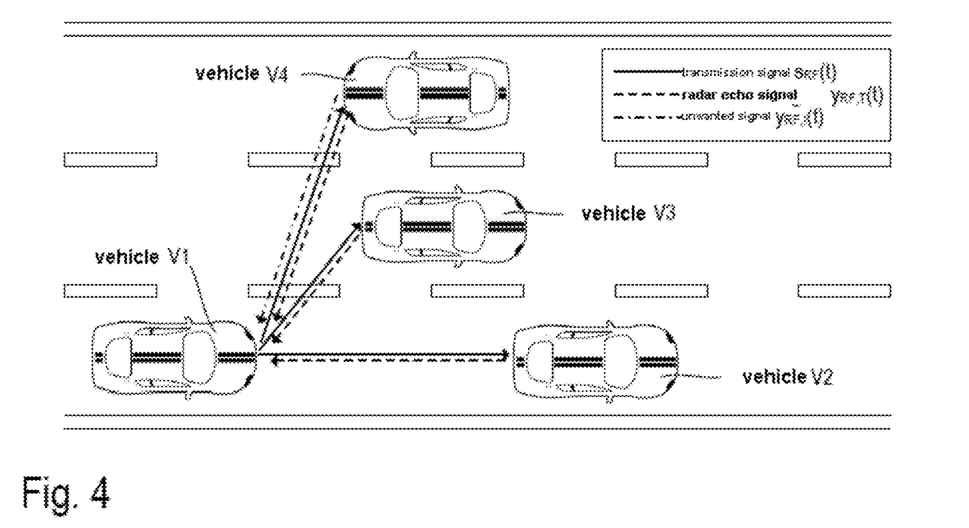
FIG. 4 is an outline to illustrate an example of how unwanted signals can be scattered into the receiving antenna of a radar sensor.

Besides echo signals, the received radar signal $y_{RF}(t)$ (cf. FIG. 1) can also contain unwanted signals caused by other RF sources, in particular by other radar sensors. These unwanted signals interfere with the echo signals from real radar targets. FIG. 4 illustrates a simple example to show how an interferer can perturb the received echo signals. FIG. 4 depicts a road having three lanes and four vehicles V1, V2, V3 and V4. At least the vehicles V1 and V4 are equipped with radar sensors. The radar sensor of the vehicle V1 transmits an RF radar signal $s_{RF}(t)$ (FIG. 4, arrows with solid lines) and the received RF radar signal $y_{RF}(t)$ contains the radar echoes from the vehicles V2 and V3 travelling ahead and also from the oncoming vehicle V4 (FIG. 4, arrows with dashed lines). In addition, the RF radar signal $y_{RF}(t)$ received by the radar sensor of the vehicle V1 contains a radar signal (unwanted signal) that was generated by the radar sensor of the oncoming vehicle V4 (FIG. 4, arrow with dot-dashed lines). The radar sensor of the vehicle V4 is an interferer for the radar sensor of the vehicle V1.

In the case of U radar targets and V interferers, the signal $y_{RF}(t)$ received by the radar sensor of the vehicle V1 can be written as follows:

$$y_{RF}(t) = y_{RF,T}(t) + y_{RF,I}(t), \text{ where} \tag{1}$$

$$y_{RF,T}(t) = \sum_{i=0}^{U-1} A_{T,i} \cdot s_{RF}(t - \Delta t_{T,i}) \text{ and} \tag{2}$$

$$y_{RF,I}(t) = \sum_{k=0}^{V-1} A_{I,k} \cdot s'_{RF,k}(t - \Delta t_{I,k}). \tag{3}$$

In equations (1) to (3) above, the signal components $y_{RF,T}(t)$ and $y_{RF,I}(t)$ of the received signal $y_{RF}(t)$ correspond to the radar echoes from real radar targets $T_i$, or to the unwanted signals. In practice, there may be multiple radar echoes and multiple interferers present. Equation (2) therefore represents the sum of the radar echoes caused by U different radar targets $T_i$, where $A_{T,i}$ denotes the attenuation of the transmitted radar signal $s_{RF}(t)$ and $\Delta t_{T,i}$ denotes the round trip delay time (RTDT) for a specific radar target $T_i$. Equally, equation (3) represents the sum of the unwanted signals caused by V interferers. In this case, $A_{I,k}$ denotes the attenuation of the unwanted signal $s'_{RF,k}(t)$ transmitted by an interferer and $\Delta t_{I,k}$ denotes the associated signal delay time (for every interferer k=0, 1, . . . , V−1). It should be noted that the radar signal $s_{RF}(t)$ transmitted by the vehicle V1 and the unwanted signal $s_{RF,0}'(t)$ transmitted by the vehicle V4 (index k=0 for vehicle V4) will normally have different chirp sequences with different chirp parameters (start/stop frequency, chirp duration, repetition rate, etc.). In addition, the amplitude of the received unwanted signal component $y_{RF,I}(t)$ can be significantly higher than the amplitude of the echo signal component $y_{RF,T}(t)$. Normally, the unwanted signal components will have significantly higher amplitudes than the signal components of the radar echoes.

Figure 5:
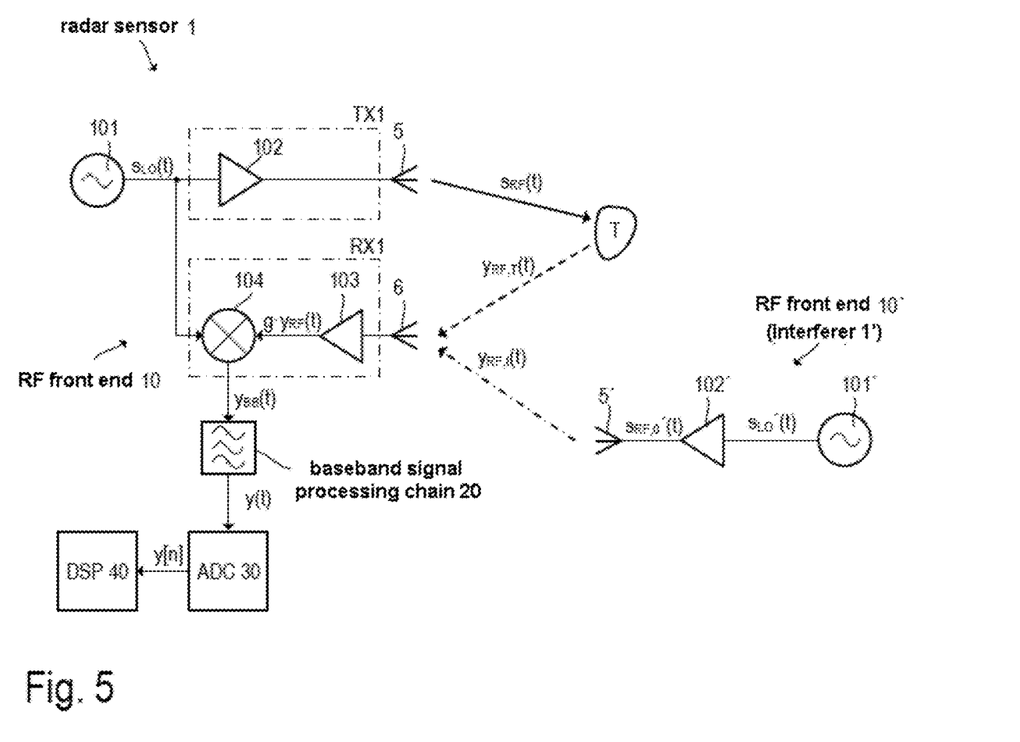
FIG. 5 is a circuit diagram to illustrate a simplified example of a radar transceiver and of a further radar transceiver that causes interference.

FIG. 5 illustrates an example implementation of a radar transceiver 1 in accordance with the example from FIG. 3 in more detail. In the present example, the RF front end 10 of the "own" radar transceiver 1 and also the RF front end 10' of another (perturbing) radar sensor 1' are depicted. It should be noted that FIG. 5 depicts a simplified circuit diagram in order to show the basic structure of the RF front end 10 with a transmission channel (TX channel TX1) and a reception channel (RX channel RX1). As mentioned, actual implementations, which can be highly dependent on the specific application, are usually more complex and have multiple TX and/or RX channels, which can also be integrated in different MMICs.

The RF front end 10 comprises a local oscillator 101 (LO) that generates an RF oscillator signal $s_{LO}(t)$. The RF oscillator signal $s_{LO}(t)$ is frequency-modulated during operation as described above with reference to FIG. 2—and is also referred to as LO signal. In radar applications, the LO signal is usually in the SHF (super high frequency) or EHF (extremely high frequency) band, e.g. in the range from 76 GHz to 81 GHz in a good many automotive applications. A fair number of radar systems operate in the 24 GHz ISM band (industrial, scientific and medical band). The LO signal $s_{LO}(t)$ is processed both in the transmission signal path TX1 (in the TX channel) and in the received signal path RX1 (in the RX channel).

The transmission signal $s_{RF}(t)$ (cf. FIG. 2) transmitted by the TX antenna 5 is generated by amplifying the LO signal $s_{LO}(t)$, for example using the RF power amplifier 102, and is therefore merely an amplified and possibly phase-shifted version of the LO signal $s_{LO}(t)$. The output of the amplifier 102 can be coupled to the TX antenna 5 (in the case of a bistatic/pseudo-monostatic radar configuration). The received signal $y_{RF}(t)$ received by the RX antenna 6 is supplied to the receiver circuit in the RX channel and hence directly or indirectly to the RF port of the mixer 104. In the present example, the RF received signal $y_{RF}(t)$ (antenna signal) is pre-amplified using the amplifier 103 (gain g). The mixer 104 thus receives the amplified RF received signal $g \cdot y_{RF}(t)$. The amplifier 103 can be e.g. an LNA (low-noise amplifier). The reference port of the mixer 104 is supplied with the LO signal $s_{LO}(t)$, so that the mixer 104 down-converts the (pre-amplified) RF received signal $y_{RF}(t)$ to baseband. The down-converted baseband signal (mixer output signal) is denoted by $y_{BB}(t)$. This baseband signal $y_{BB}(t)$ is first processed further in analog fashion, the analog baseband signal processing chain 20 substantially causing an amplification and a (e.g. bandpass or low-pass) filtering, for example in order to reject undesirable sidebands and image frequencies. The resulting analog output signal, which is supplied to an analog-to-digital converter (see FIG. 3, ADC 30), is denoted by y(t). Methods for digital further processing of the digitized output signal (digital radar signal y[n]) are known per se (for example range-Doppler analysis) and are therefore not discussed in more detail here.

In the present example, the mixer 104 down-converts the pre-amplified RF received signal $g \cdot y_{RF}(t)$ (e.g. the amplified antenna signal) to baseband. The conversion can take place in one stage (that is to say from the RF band directly to baseband) or via one or more intermediate stages (that is to say from the RF band to an intermediate-frequency band and on to baseband). In this case, the receiving mixer 104 effectively comprises multiple series-connected individual mixer stages. In addition, the mixer stage can contain an IQ mixer that generates two baseband signals (inphase and quadrature signals) that can be interpreted as a real part and an imaginary part of a complex baseband signal.

FIG. 5 additionally shows a part (the TX channel of the RF front end 10') of a further radar sensor 1', which is an interferer for the radar sensor 1. The RF front end 10' of the radar sensor 1' contains a further local oscillator 101', which generates an LO signal $s_{LO}'(t)$ that is amplified by the amplifier 102'. The amplified LO signal is transmitted as RF radar signal $s_{RF,0}'(t)$ via the antenna 5' of the radar sensor 1' (cf. equation (3)). This RF radar signal $s_{RF,0}'(t)$ contributes to the unwanted signal component $y_{RF,I}(t)$ received by the antenna 6 of the other radar sensor 1 and can cause the aforementioned interference.

Figure 6:
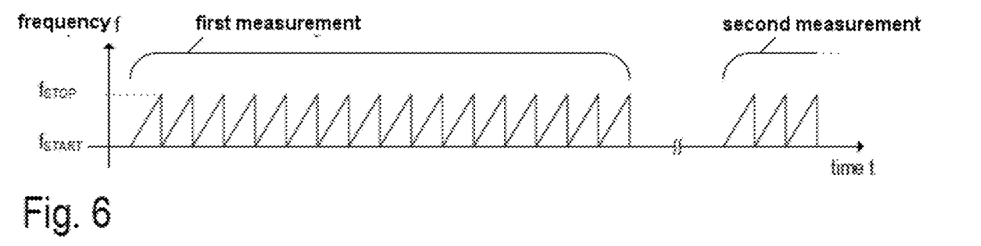
FIG. 6 uses a timing diagram (frequency over time) to show an example of a transmitted radar signal having multiple sequences of chirps, each sequence having a specific number of chirps that are used for a measurement.

FIG. 6 schematically illustrates an example of an FM scheme as usually used in FMCW radar sensors for the frequency modulation (FM) of the LO signal $s_{LO}(t)$. In the example depicted, a sequence of chirps is generated for every measurement. In FIG. 6, the first sequence contains only 16 chirps. In practice, however, a sequence can have substantially more chirps, for example 128 or 256 chirps. A number corresponding to a power of two permits the use of efficient FFT (fast Fourier transform) algorithms in the subsequent digital signal processing (e.g. in the range-Doppler analysis). There can be a pause between the individual sequences.

Figure 7:
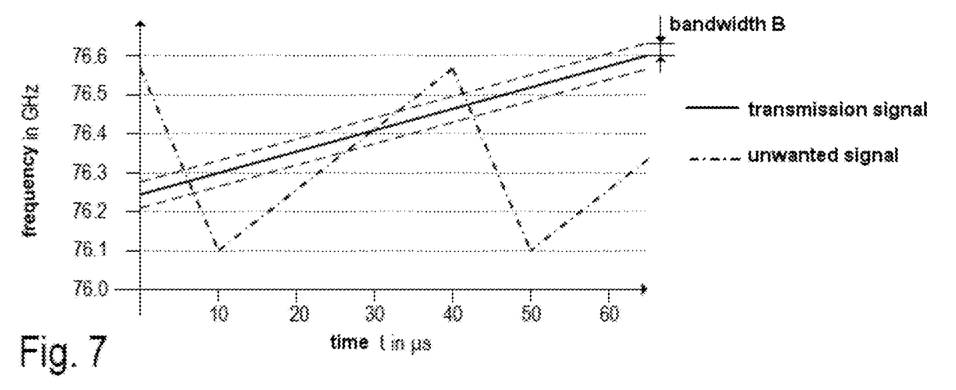
FIG. 7 shows a timing diagram for a transmission signal from a radar sensor along with a transmission signal causing the interference (unwanted signal) from a further radar sensor (interferer), wherein the waveforms (frequency over time) of these signals partially overlap.
Figure 8:
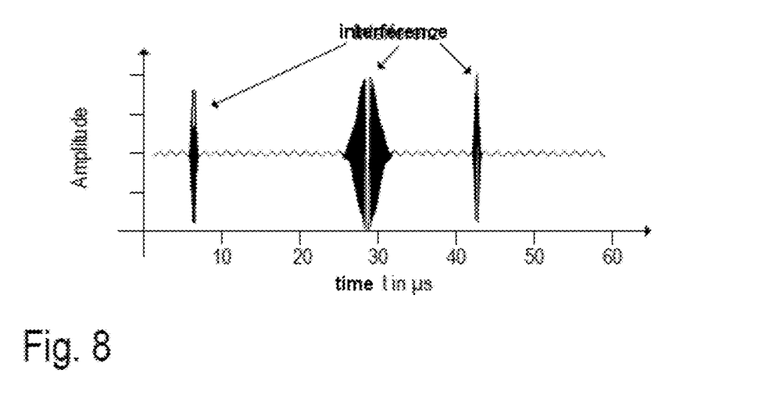
FIG. 8 shows a timing diagram for an example waveform of a radar signal (after mixing to baseband) that contains a radar echo from a radar target and an unwanted signal (interference).

FIGS. 7 and 8 use an example to illustrate how an interferer can perturb the radar echoes contained in the RF signal $y_{RF}(t)$ received by the radar sensor 1. FIG. 7 uses a graph (frequency over time) to show a chirp transmitted by the radar sensor 1 with a chirp duration of 60 µs (FIG. 7, solid line). The start frequency of the transmitted signal $s_{RF}(t)$ is approximately 76 250 MHz and the stop frequency is approximately 76 600 MHz. An unwanted signal $y_{RF,I}(t)$ generated by another radar sensor contains an up-chirp with a start frequency of approximately 76 100 MHz, a stop frequency of approximately 76 580 MHz and a chirp duration of 30 µs, and a subsequent down-chirp that starts at the stop frequency of the preceding chirp and ends at the start frequency of the subsequent chirp and has a chirp duration of 10 µs (FIG. 7, dot-dashed line). The bandwidth B of the baseband signal of the radar sensor is substantially determined by the baseband signal processing chain 20 and is indicated in FIG. 7 by the dashed lines. FIG. 8 shows an example waveform of the (preprocessed) baseband signal y(t) of the radar sensor 1. It can be seen that the signal components have a significant amplitude on account of the interference in those time intervals in which the frequencies of the transmission signal and the unwanted signal have a frequency difference that is less than or equal to the bandwidth B of the radar sensor (see FIGS. 7 and 8). In the present example, the interference occurs three times over the chirp duration of 60 µs, namely at approximately 7 µs, 28 µs and 42 µs. As mentioned, the power of the unwanted signal will usually be higher than the power of the radar echoes from real targets. In addition, the unwanted signals and the transmission signal of the radar sensor 1 under consideration are uncorrelated (exceptions aside, which are not considered here), which is why the interference can be regarded as noise (in the sense of a wideband perturbation) and hence increases the noise floor.

Various concepts for rejecting interference-induced perturbations have been proposed. Some concepts presuppose that individual signal segments of the digital radar signal y[n] that are impaired by a perturbation (which are able to be assigned to a chirp in the RF transmission signal $s_{RF}(t)$) are identified as "impaired". The impaired signal segments are normally rejected and ignored in the further signal processing. Other concepts presuppose that individual samples of the digital radar signal y[n] that are impaired by a perturbation are identified as "impaired". In this case, the affected signal segment does not have to be rejected as a whole, but rather the affected samples can be corrected selectively (e.g. using interpolation/approximation) in order to reject the perturbation.

The aim of the concepts described below is to reliably and robustly (e.g. regardless of the specific situation) identify samples or groups of successive samples that are potentially impaired by perturbations and therefore cannot (and are not supposed to) be taken into consideration for the object detection. As depicted in FIG. 8, interference is manifested as comparatively short pulses, which are referred to as interference bursts below. Within such a burst, the frequency first decreases and then increases again. In order to be able to "cut out" an interference burst from the digital radar signal as accurately as possible the onset is detected and the end of the respective burst is detected as accurately and reliably as possible. The concepts described here use the envelope of the digital radar signal y[n] for this purpose, the signal being processed in segments, for example.

Figure 9A:
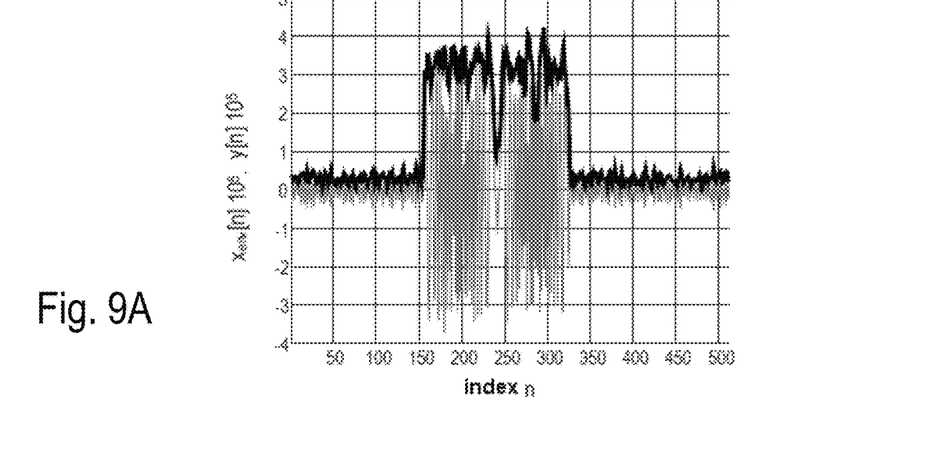
FIGS. 9A-C use an example timing diagram to illustrate the result of the determination of the envelope of a baseband signal with an interference-induced perturbation using different methods of calculation.
Figure 9B:
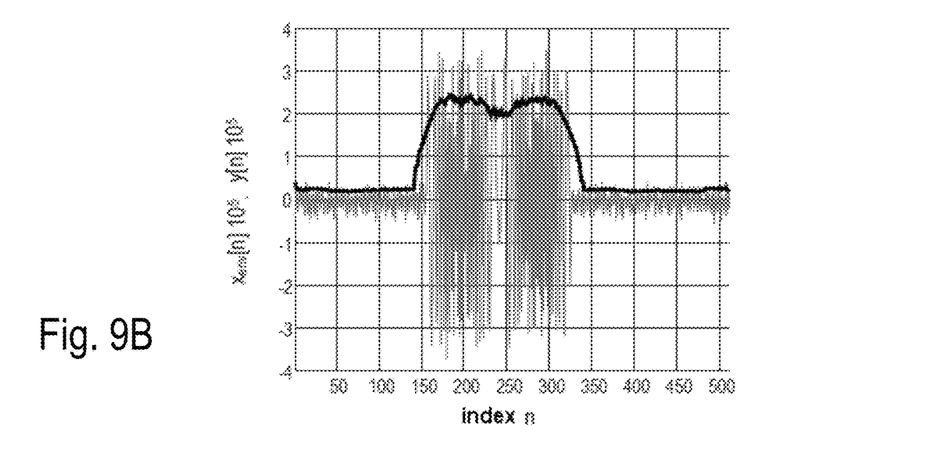
Figure 9C:
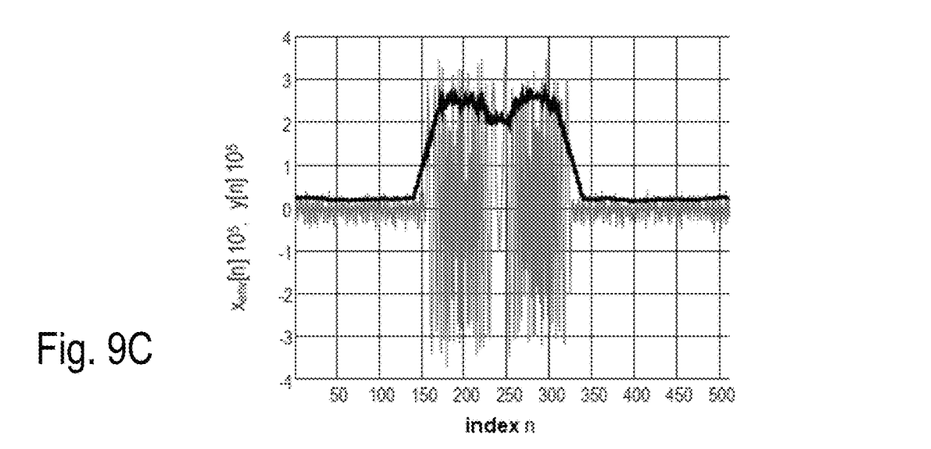

FIGS. 9A-9C are timing diagrams depicting, in example fashion, a 1024-sample segment of a digital radar signal y[n] that contains an interference signal (in the present example an interference burst). In a first step, an envelope of the signal segment under consideration is ascertained, this being able to be done in different ways. The results of the different approaches to calculating the envelope are depicted in FIGS. 9A-9C One way of calculating a signal $x_{env}[n]$ that represents the envelope is to calculate the absolute value of the analytic representation of the digital radar signal y[n]. FIG. 9A shows an example segment of the digital radar signal and the absolute value of the associated analytic signal. The absolute value represents the envelope $x_{env}[n]$. An analytic signal is a complex-value signal whose imaginary part is the Hilbert transform of the real part. If an IQ mixer is used in the RF front end (see FIG. 5, RF front end 10) of the radar sensor to generate the baseband signal, the digital radar signal y[n] is already an analytic signal (real part and imaginary part corresponding to inphase and quadrature components). If a real baseband signal is generated, the associated imaginary part can be generated using a Hilbert transformer. In this case, the signal $x_{env}[n]$ representing the envelope is:

$$x_{env}[n]=\sqrt{y[n]^2+\mathcal{H}\{y[n]\}^2}, \qquad (4)$$

where y[n] denotes the real baseband signal and $\mathcal{H}\{y[n]\}$ denotes the associated Hilbert-transformed signal (that is to say the imaginary part belonging to y[n]).

A Hilbert transformer can be implemented e.g. as an allpass filter that has a constant phase response of π/2. The allpass filter can be implemented as a finite impulse response filter. The generation of an analytic signal using a Hilbert transformer and subsequent calculation of the envelope by forming the absolute value of the complex-value, analytic signal is known per se and is therefore not discussed further here.

Another way of calculating a signal that represents the envelope is the approximation of an RMS (root mean square) value by using a moving average of the instantaneous signalling. The result of this approach is depicted in FIG. 9B. In this case, the signal $x_{env}[n]$ representing the envelope is:

$$x_{env}[n] = \sqrt{\frac{1}{L}\sum_{i=n-L/2+1}^{n+L/2} y[i]^2}, \begin{pmatrix} \text{for even-}L \\ \text{numbered} \end{pmatrix} \qquad (5)$$

where L represents the window length used for calculating the moving average. In one example, L=30 is used. The square root of the RMS value would also be suitable as a signal that represents the envelope.

Another way of calculating a signal that represents the envelope is to use a cell-averaging CFAR algorithm, which can also be used for other purposes in radar systems. The parameters for the CFAR algorithm can be chosen such that the envelope is delivered with the desired accuracy. The result is similar to in the case of the approximation according to equation 5, but, depending on the specific implementation in the computing units (see FIG. 4, numeral 40) of the radar sensors, there may already be provision for a hardware acceleration for performing the CFAR algorithm, which permits very fast calculation of the signal $x_{env}[n]$ representing the envelope. The result of this approach is depicted in FIG. 9C.

It should be noted at this juncture that a segment of the digital radar signal y[n] is always considered in the examples described here. The ascertained envelope signal $x_{env}[n]$ is therefore a finite signal that belongs to the considered segment of the digital radar signal y[n]. In the examples described here, the length (number of samples) of the segment of the digital radar signal y[n] and hence the length of the associated envelope signal $x_{env}[n]$ is N samples, where N=1024. Depending on the method of calculation used, the envelope signal $x_{env}[n]$ can also comprise fewer than N samples. The considered segment of the digital radar signal y[n] can usually be assigned to a specific chirp of the transmitted chirp sequence (e.g. of the transmitted RF transmission signal $s_{RF}(t)$). For a chirp sequence having M chirps (see FIG. 6, example sequence having 16 chirps), it is thus possible for M corresponding segments of the digital radar signal y[n] to be ascertained (and hence also M corresponding envelope signals $x_{env}[n]$). The concepts described here can be applied separately for each of the envelope signals $x_{env}[n]$. Where reference is made to the digital radar signal y[n] below, it usually means the currently considered segment of the digital radar signal y[n].

It can be seen in FIGS. 9A-9C that all three of the aforementioned ways of calculating the signal $x_{env}[n]$ (subsequently referred to as envelope signal) lead to a similar result. After the envelope signal $x_{env}[n]$, which represents the envelope of the considered segment of the digital radar signal y[n], has been calculated, the onset and end of the interference burst are detected next. The example implementations described here use a statistical approach in order to make the detection more robust. A first example is explained below on the basis of the graphs from FIGS. 10A and 10B.

Figure 10A:
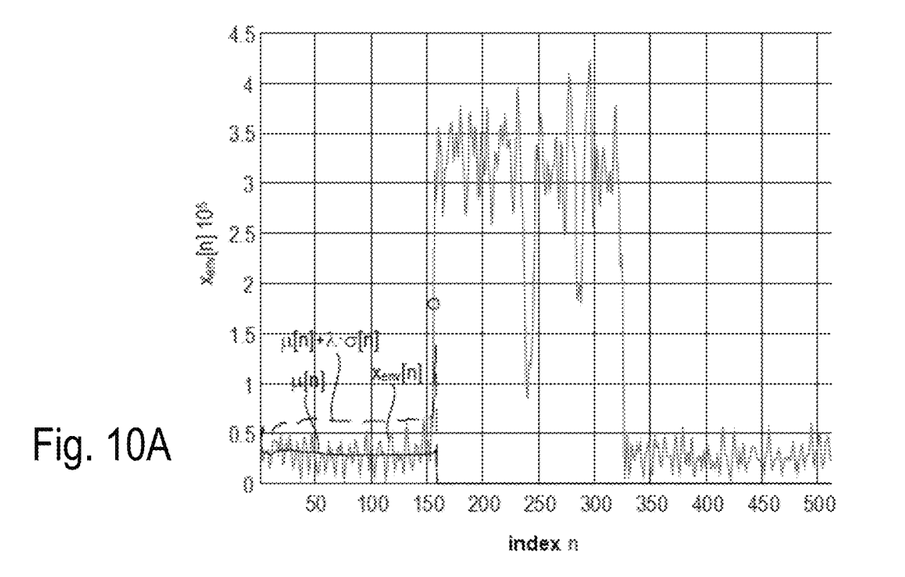
FIGS. 10A and 10B illustrate the identification of a signal segment that substantially contains an interference-induced perturbation on the basis of the previously determined envelope of the baseband signal.

According to FIG. 10A, statistical parameters are continually calculated for the signal $x_{env}[n]$, namely a running mean value $\mu[n]$ and a running standard deviation $\sigma[n]$, e.g.

$$\mu[n] = \frac{1}{n - n_0 + 1} \sum_{i=n_0}^{n} x_{env}[i], \text{ and} \quad (6)$$

$$\sigma[n] = \sqrt{\frac{1}{n - n_0 + 1} \sum_{i=n_0}^{n} (x_{env}[i] - \mu[i])^2}, \quad (7)$$

where $n = n_0, n_0 + 1, n_0 + 2, \ldots$ where $n_0=0$ holds for the start index in the present example from FIG. 10A. In every time step, e.g. for every time index n, the inequation $$x_{env}[n] > \mu[n] + \lambda \cdot \pi[n] \quad (8)$$

is evaluated, where λ is a constant, predetermined parameter. In other words, the envelope signal $x_{env}[n]$ is compared with a threshold value $\mu[n]+\lambda \cdot \sigma[n]$, which is dependent on statistical parameters that characterize the envelope signal $x_{env}[n]$ itself and are dependent thereon. Inequation 8 is evaluated for rising time indices n=0, 1, 2, . . . . If in equation 8 is satisfied for a specific number of successive samples (e.g. for n=$n_1$, $n_1+1$, $n_i+2$), then the time index of the first of these successive samples (that is to say n=$n_1$) is defined as the time of the onset of an interference burst. The applicable sample $x_{env}[n_1]$ is marked by a circle in FIG. 10A. At this juncture, it should be noted that the envelope signal $x_{env}[n]$ is processed in segments, the segment length N being equal to 1024 (e.g. n=0, 1, . . . , 1023) in the present example. Every processed segment can be assigned to a specific chirp in the transmitted RF signal $s_{RF}(t)$, which does not necessarily have to be the case for the concepts described here, however.

Figure 10B:
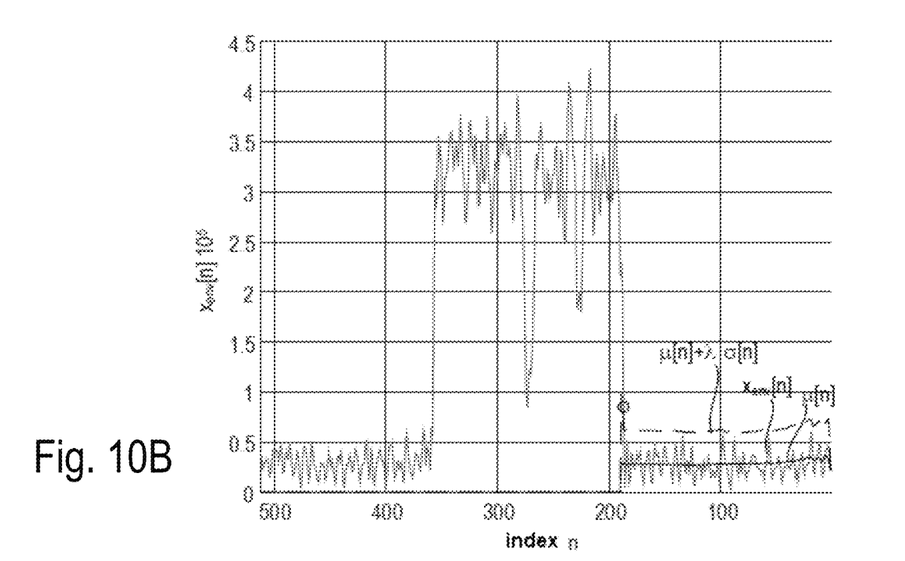

FIG. 10B illustrates the detection of the time of the end of the interference burst. This can be done in the same way as the detection of the onset of the interference burst, for example by virtue of the method described above being applied to the "reversed" signal $x'_{env}[n]=x_{env}[N-1-n]$ (for signal segments having N samples, e.g. n=0, . . . , N−1). Reversing of the signal $x_{env}[n]$ is not absolutely necessary, however; alternatively, equations (6) and (7) can be adapted as appropriate.

Figure 11:
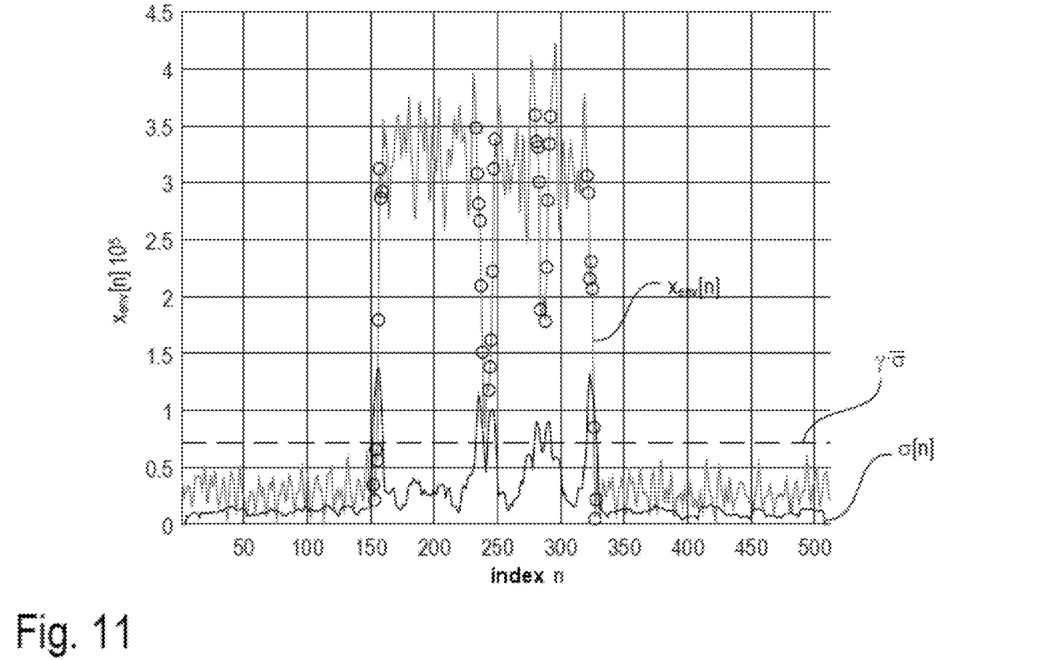
FIGS. 11 and 12 illustrate an alternative approach to FIGS. 10A and 10B.

Another approach to detecting the onset of an interference burst on the basis of the envelope signal $x_{env}[n]$ calculated beforehand is explained below on the basis of FIGS. 11 and 12. In accordance with the example from FIG. 11, statistical parameters are continually calculated for the signal $x_{env}[n]$, namely a "local" standard deviation $\sigma[n]$ (e.g. the standard deviation of the samples in a moving window) and a scaled mean value of the local standard deviation $\sigma[n]$. The signal $x_{env}[n]$ is considered in segments as in the previous example, e.g. the segments for n=0+$s_i$, . . . , N−1+$s_i$, where N denotes the length of the segment (e.g. N=1024) and $s_i$ denotes the start index of the i-th segment (e.g. $s_1=0$, $s_2=1024$, etc.). The signal segment $x_{env}[n]$, for n=0, . . . , 1023, is considered below as an illustrative example. The individual segments of the envelope signal $x_{env}[n]$ can each be assigned to a specific chirp in the transmitted RF signal $s_{RF}(t)$, which does not necessarily have to be the case, however.

The aforementioned standard deviation $\sigma[n]$ of a moving window having K samples can be calculated as follows:

$$\sigma[n] = \sqrt{\frac{1}{K} \sum_{i=n-K/2+1}^{n+K/2} (x_{env}[i] - \mu[i])^2}, \text{ with} \quad (9)$$

$$\mu[n] = \frac{1}{K} \sum_{i=n-K/2+1}^{n+K/2} x_{env}[i], \text{ for } n = 0, 1, \ldots, N-1. \quad (10)$$

The window length is an even number in this example. In order to be able to calculate the standard deviation $\sigma[n]$ for time indices n<K/2−1 and n≥N−K/2, the considered segment of the signal $x_{env}[i]$ can have zeros added at the edges (zero padding). Alternatively, the range of definition of $\sigma[n]$ can also be reduced as appropriate. The bottom waveform in FIG. 11 represents the "local standard deviation" $\sigma[n]$ according to equation 9.

This standard deviation $\sigma[n]$ calculated in accordance with equation 9 is continually compared with a threshold value $\lambda \cdot \overline{\sigma}$, which is likewise a statistical parameter, namely a scaled mean value of the standard deviation of the considered segment in the present example. The threshold value can accordingly be calculated as follows:

$$\lambda \cdot \overline{\sigma} = \lambda \cdot \frac{1}{N} \sum_{n=0}^{N-1} \sigma[n], \quad (11)$$

where λ is a predetermined constant scaling factor. At the onset and at the end of an interference burst, the local standard deviation $\sigma[n]$ calculated for the moving window will rise. For every time index n, a check is performed to ascertain whether the associated value $\sigma[n]$ is above the threshold value $\lambda \cdot \overline{\sigma}$, e.g. the following inequation is evaluated:

$$\sigma[n] > \lambda \cdot \overline{\sigma}. \quad (12)$$

Inequation 12 is evaluated for rising time indices n=0, 1, 2, . . . . If inequation 12 is satisfied for a specific number of successive samples (e.g. for n=$n_1$, $n_1+1$, $n_i+2$), then the time index of the first of these successive samples (that is to say n=$n_1$) is defined as the time of the onset of an interference burst (analogously to the previous example from FIGS. 10A and 10B). The time of the end of the interference burst can be ascertained in a similar manner. In exchange, inequation 12 can be evaluated for falling time indices n=N−1, N−2, N−3, . . . , and, if inequation 12 is satisfied for a specific number of successive samples (e.g. for n=$n_2$, $n_2$−1, $n_2$−2), then the time index of the first of these successive samples (that is to say n=$n_2$) is defined as the time of the end of the interference burst.

Figure 12:
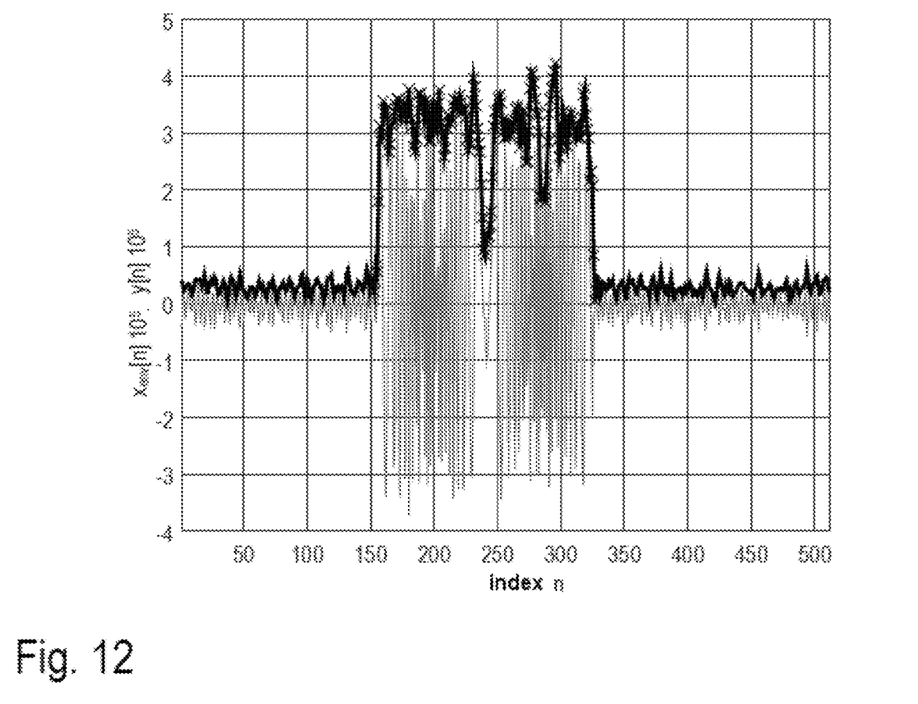

All time indices n between the detected time indices $n_1$ and $n_2$ (e.g. $n_1$<n<$n_2$) can be defined as belonging to the interference burst, and the digital radar signal y[n] is regarded as impaired by interference in the section $n_1$≤n≤$n_2$ (see FIG. 12). In the subsequent digital signal processing, the sections impaired by interference can be taken into consideration especially, for example in order to at least approximately restore the unperturbed signal in these sections using suitable interpolation/approximation methods.

It goes without saying that if an interference burst is situated at the onset of the considered signal segment y[n] (and hence also in $x_{env}$[n]), the onset of the interference burst sometimes cannot readily be detected using the approaches described above. This also applies in equal measure to the detection of the end of the interference burst if it is situated at the end of the considered signal segment y[n]. In these cases, only the end (index $n_2$) of the interference burst (if it is situated at the onset of the signal segment) or the onset (index $n_1$) of the interference burst (if it is situated at the end of the signal segment) is detected. In this case, the section impaired by interference is 0≤n≤$n_2$ or $n_1$≤n≤N−1. The "interference burst situated at the onset of the segment" and "interference burst situated at the end of the segment" cases can be distinguished on the basis of various criteria (e.g. by comparing the envelope signal $x_{env}$[n] with a fixed, predefined threshold value). In addition, the case may also arise in which a segment is impaired by multiple interference bursts. In this case, the segment can be e.g. broken down into subsegments having a respective interference burst, and these subsegments are processed in accordance with the concepts described here. The presence of multiple interference bursts can also be detected e.g. using a fixed, predefined threshold value.

Several aspects of the method described here are summarized below on the basis of the flow diagram from FIG. 13, this being merely an example rather than a complete list of technical features. In accordance with FIG. 13, a radar receiver (see e.g. FIG. 5, RX channel RX1, baseband signal processing 20 and ADC 30) delivers a digital radar signal y[n], which comprises a multiplicity of segments (see FIG. 13, step S1). The radar signal y[n] can be processed in segments. In the examples described here, each of the segments can be assigned to a specific chirp (cf. FIG. 6) in the RF transmission signal $s_{RF}$(t) (one-to-one association), which does not necessarily have to be the case, however.

Figure 13:
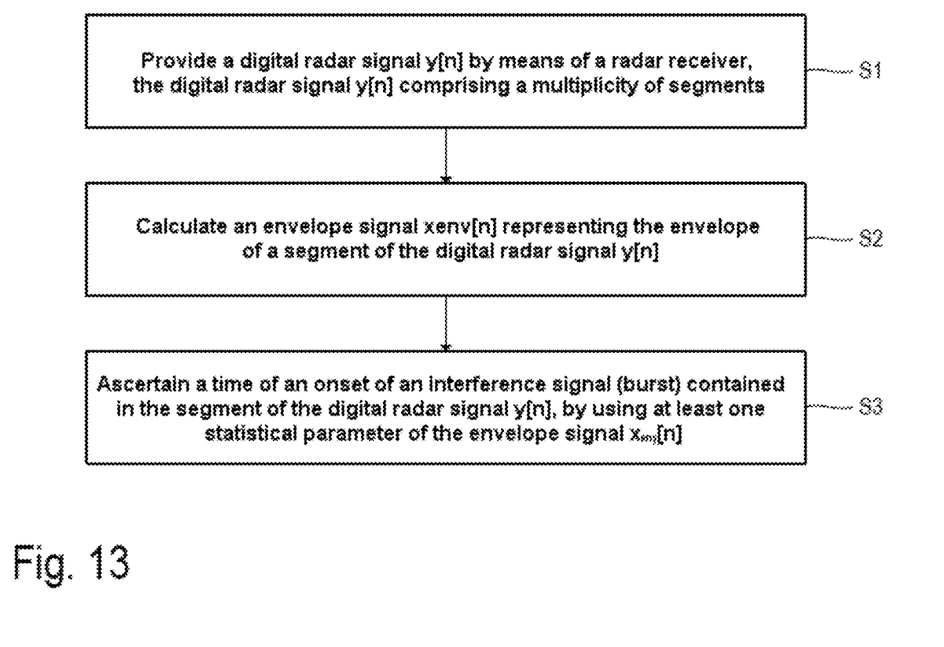
FIG. 13 is a flow diagram to illustrate an example implementation of the method described here.

In accordance with FIG. 13, an envelope signal $x_{env}$[n] is calculated that represents the envelope of a segment of the digital radar signal y[n] (see FIG. 13, step S2). That is to say that an envelope signal $x_{env}$[n] can be ascertained for every segment of the digital radar signal y[n] (segment by segment). The calculation does not necessarily have to be performed for every segment of the digital radar signal y[n], however. In the examples described here, an envelope signal $x_{env}$[n] is calculated for every segment that is later processed further for a radar measurement, however. Subsequently, a (start) time at which an interference signal contained in the considered segment of the digital radar signal y[n] begins is calculated by using at least one statistical parameter of the envelope signal $x_{env}$[n]—(see FIG. 13, step S3). In order to ascertain the at least one statistical parameter of the envelope signal $x_{env}$[n], a statistical analysis of the envelope signal $x_{env}$[n] can be performed. In particular, mean values and standard deviations can be calculated.

In accordance with one example, the ascertaining of the aforementioned (start) time (denoted by the time index $n_1$ in the examples described earlier on) involves ascertaining the at least one statistical parameter of the envelope signal $x_{env}$[n] for a multiplicity of successive time indices of the envelope signal $x_{env}$[n], calculating a threshold value (cf. equation 8, threshold value $\mu[n]+\lambda\cdot\sigma[n]$) for each of the successive time indices on the basis of the associated at least one statistical parameter and detecting the time index $n_1$ that represents the time of the onset of the interference signal (burst). The detection is based on a comparison of the envelope signal $x_{env}$[n] with the associated threshold values (cf. equation 8 and FIGS. 10A and 10B) for the multiplicity of successive time indices. The at least one statistical parameter can be a mean value and a standard deviation of the envelope signal $x_{env}$[n], which are each calculated in a variable time window. Variable time window means that the (temporal) length of the time window varies. It begins e.g. at a fixed start index (e.g. n=0) and ends at the currently considered time index n of the envelope signal $x_{env}$[n]. That is to say that every time index n of the envelope signal $x_{env}$[n] can be assigned a mean value $\mu[n]$ and a standard deviation u[n]. Accordingly, a threshold value $\mu[n]+\lambda\cdot\sigma[n]$ can be calculated for every time index n of the envelope signal $x_{env}$[n].

In accordance with a further example implementation, the ascertaining of the aforementioned (start) time of the interference signal (burst) involves ascertaining a statistical parameter (e.g. standard deviation $\sigma[n]$) of the envelope signal $x_{env}$[n] for a multiplicity of successive time indices. Subsequently, a threshold value (e.g. $\lambda\cdot\bar{\pi}$, see equation 11) is calculated on the basis of the ascertained statistical parameters. That is to say that in this example a (single) threshold value is calculated for every envelope signal $x_{env}$[n]. Subsequently, the aforementioned time index is detected, representing the time of the onset of the interference signal. This detection is based on a comparison of the statistical parameters ascertained for a multiplicity of successive time indices with the one threshold value (see equation 12). The at least one statistical parameter can be a standard deviation $\sigma[n]$ of the envelope signal $x_{env}$[n] calculated in a moving time window (of e.g. constant length), and the threshold value can be calculated on the basis of a mean value $\bar{\sigma}$ of the ascertained standard deviations $\sigma[n]$. Unlike in the example described above, the samples of the envelope signal $x_{env}$[n] are not compared with a (variable) threshold value in this case, but rather—for every time index—the calculated standard deviations $\sigma[n]$ are compared with a constant threshold value ascertained for the respective segment.

The invention claimed is:
1. A method, comprising:
   processing a digital radar signal, of a radar receiver, comprising a plurality of segments,
      wherein a segment of the plurality of segments is assigned to a specific chirp of a plurality of chirps associated with the digital radar signal;
   calculating an envelope signal that represents an envelope of the segment of the digital radar signal;
   calculating a running mean value and a running standard deviation of the envelope signal;
   calculating a threshold value based on a scaled mean value of the running standard deviation;

determining, based on a comparison of the envelop signal to the threshold value, whether the threshold value is satisfied for a number of consecutive segments of the plurality of segments;

determining, based on determining whether the threshold value is satisfied for the number of consecutive segments, a time of an onset of an interference signal contained in the envelope signal, another time of an end of the interference signal contained in the envelope signal; and identifying, based on determining the time of the onset of the interference signal and the other time of the end of the interference signal, samples of the digital radar signal impaired by the interference signal.

2. The method as claimed in claim 1, further comprising: analyzing the envelope signal to calculate the running mean value and the running standard deviation.

3. The method as claimed in claim 1, wherein the calculating of the envelope signal comprises:

calculating an absolute value of an analytic signal that represents the digital radar signal, and wherein:
the digital radar signal is provided as the analytic signal by the radar receiver, or
the analytic signal is calculated based on the digital radar signal by using a Hilbert transformation.

4. The method as claimed in claim 1, wherein the calculating of the envelope signal comprises:

calculating a root mean square (RMS) signal based on the digital radar signal,
wherein the envelope signal is the RMS signal.

5. The method as claimed in claim 1, wherein the calculating of the envelope signal comprises:

determining the envelope signal based on a constant false alarm rate algorithm.

6. The method as claimed in claim 1, wherein the running mean value and the running standard deviation are associated with successive time indices of the envelope signal; and wherein the method further comprises:

detecting a time index, of the successive time indices, that represents the time of the onset of the interference signal.

7. The method as claimed in claim 6, wherein calculating the threshold value comprises:

calculating a plurality of threshold values of the envelope signal,
wherein each threshold value of the plurality of threshold values is associated with a respective time index of the successive time indices and calculated based on the running mean value and the running standard deviation associated with the respective time index, and wherein determining the time of the onset of the interference signal comprises:
determining the time of the onset of the interference signal based on the comparison of the envelope signal to the plurality of threshold values.

8. The method as claimed in claim 6, wherein calculating the threshold value comprises:

calculating a single threshold value based on the running mean value of the running standard deviation associated with each of the successive time indices, and wherein determining the time of the onset of the interference signal comprises:
determining the time of the onset of the interference signal based on the comparison of the envelope signal to the threshold value.

9. The method as claimed in claim 1, wherein the running mean value and the running standard deviation are calculated in a variable time window.

10. The method as claimed in claim 9, wherein the variable time window extends from a stipulated start time index to a variable end time index.

11. The method as claimed in claim 1, wherein the running standard deviation is calculated in a moving time window.

12. The method as claimed in claim 1, wherein the envelope corresponds to a chirp of the plurality of chirps of the digital radar signal.

13. The method as claimed in claim 1, wherein the segment is to be processed for a radar measurement after determining the other time of the end of the interference signal.

14. A radar system, comprising:

a radar receiver configured to receive a second radar signal based on a transmission of a first radar signal; and a computing unit configured to:
calculate an envelope signal that represents an envelope of a segment of a plurality of segments of a digital radar signal associated with the second radar signal, wherein the segment of the digital radar signal comprises an interference signal and a non-interference signal,
wherein the segment is assigned to a specific chirp of a plurality of chirps associated with the digital radar signal;

calculate a running mean value and a running standard deviation of the envelope signal;

calculate a threshold value based on a scaled mean value of the running standard deviation;

determine, based on a comparison of the envelope signal to the threshold value, whether the threshold value is satisfied for a number of consecutive segments of the plurality of segments; and determine, based on determining whether the threshold value is satisfied for the number of consecutive segments, a time of an onset or an end of the interference signal contained in the segment of the digital radar signal.

15. The radar system as claimed in claim 14, wherein the running mean value and the running standard deviation are associated with successive time indices of the envelope signal, and wherein the computing unit is further configured to:
detect a time index of the successive time indices that represents the time of the onset of the interference signal.

16. The radar system as claimed in claim 15, wherein the running mean value and the running standard deviation are calculated in a variable time window.

17. The radar system as claimed in claim 14, wherein the running standard deviation is calculated in a moving time window.

18. The radar system as claimed in claim 14, wherein the envelope corresponds to a chirp of the plurality of chirps of the digital radar signal.

19. The radar system of claim 14, wherein the computing unit is further configured to:

determine, based on the comparison of the envelope signal to the threshold value, a time of a different one of the onset or the end of the interference signal contained in the segment of the digital radar signal; and identify, based on determining the time of the different one of the onset or the end of the interference signal and determining the time of the end of the interference signal, samples of the digital radar signal impaired by the interference signal.

20. The radar system as claimed in claim 14, wherein the segment is to be processed for a radar measurement after determining the time of the end of the interference signal.

\* \* \* \* \*